G. H. CHAPEL.
EYEGLASSES.
APPLICATION FILED JAN. 12, 1914.
1,104,034. Patented July 21, 1914.
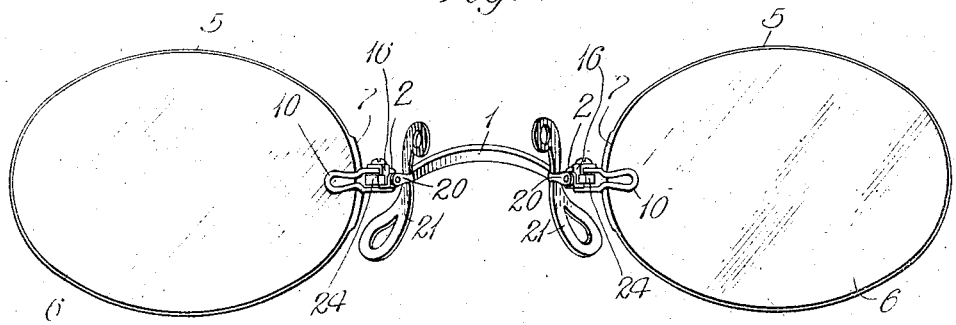
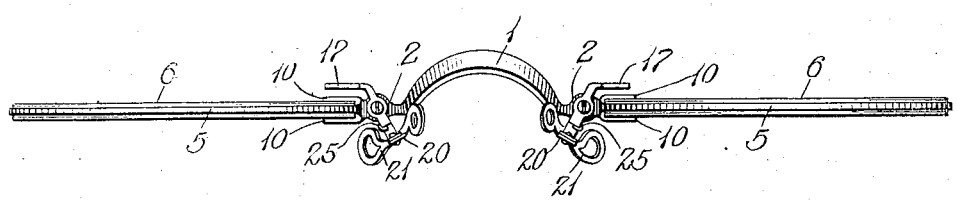
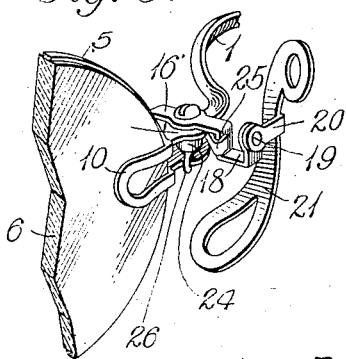
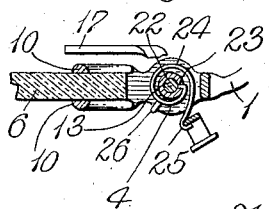
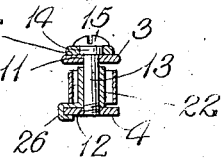
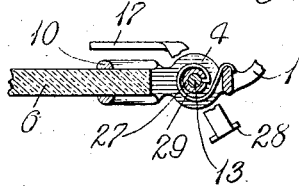
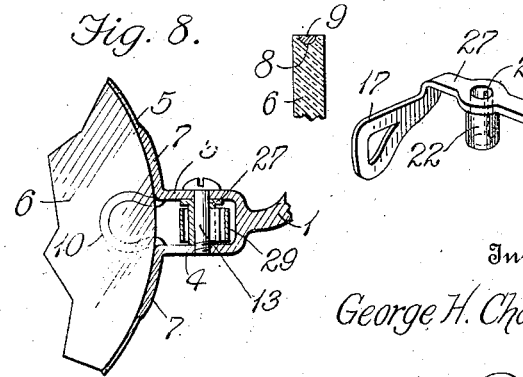
Witnesses
Chas. W. Stauffiger
Anna M. Dorr
Inventor
George H. Chapel,
By Barthel & Barthel
Attorneys

UNITED STATES PATENT OFFICE.

GEORGE H. CHAPEL, OF HOWELL, MICHIGAN.

EYEGLASSES.

1,104,034.

Specification of Letters Patent.

Patented July 21, 1914.

Application filed January 12, 1914. Serial No. 811,692.

*To all whom it may concern:*

Be it known that I, GEORGE H. CHAPEL, a citizen of the United States of America, residing at Howell, in the county of Livingston and State of Michigan, have invented certain new and useful Improvements in Eyeglasses, of which the following is a specification, reference being had therein to the accompanying drawings.

This invention relates to eye glasses, and the primary object of my invention is to provide positive and reliable means, in a manner as hereinafter set forth, for safely and rigidly holding lenses relatively to a nose piece or bridge, without the necessity of drilling the lenses or resorting to a holdfast device that passes through the lenses, thereby precluding any danger of the lenses being broken due to weakened portions thereof, and yet so constructed as to give the appearance of rimless glasses.

Another object of this invention is to provide practically rimless eye glasses which have novel finger piece bearings in the form of clamping members that prevent the movable parts of the eye glasses from becoming accidentally displaced and insure a rigid connection between the bridge and the lenses.

A further object of this invention is to provide a frame for lenses embodying integral rims, clips and a bridge, the rims being contractible whereby the edges of lenses can be clamped in the rims between the clips, thereby providing a simple, durable and inexpensive mechanical construction that permits of the parts of eye glasses being quickly assembled.

With the above and other objects in view, the invention resides in the novel construction, combination and arrangement of parts to be hereinafter specifically described and then claimed, and reference will now be had to the drawings, wherein—

Figure 1 is a front elevation of eye glasses in accordance with my invention; Fig. 2 is a plan of the same; Fig. 3 is an enlarged perspective view of a portion of the glasses; Fig. 4 is a horizontal sectional view of a portion of the glasses; Fig. 5 is a vertical sectional view of a contractible clamping member; Fig. 6 is an enlarged sectional view of a portion of a glass illustrating a modification of the invention; Fig. 7 is a horizontal sectional view of a portion of the glasses illustrating a modification of the invention; Fig. 8 is a longitudinal sectional view of the same, and Fig. 9 is a perspective view of a detached finger piece.

In the drawing, the reference numeral 1 denotes a bridge or nose piece of the ordinary and well known shape and the ends thereof are bifurcated to provide clamping members 2 having contractible top and bottom walls 3 and 4, which have the ends thereof formed integral with rims 5 adapted to hold lenses 6. As the construction of the rims 5 and other parts of the ends of the bridge 1 are identical, I deem it only necessary to describe one half of the eye glasses, yet, from time to time, consider the advantages derived from the entire structure.

The top and bottom walls 3 and 4 are circular in plan and are arranged in parallelism.

At the junction of the walls 3 and 4 with the rims 5, the rim has a filler or reinforcement 7 that eliminates any weakness and prevents the rims from accidentally breaking when adjusted to the lens 6. The rim 5 is made of steel or a material that will hormonize in color with the lens 6, and by making the rim narrow and flat, as best shown in Fig. 2, the rim is practically invisible, but nevertheless, has sufficient strength to serve as a band that can be drawn or contracted upon the lens to firmly hold the same. It is possible, however, to provide the lense with a marginal groove 8, shown in Fig. 6, and then use a rim that is semi-cylindrical, as indicated at 9. Such a rim cannot become accidentally displaced and is less visible than the rim 5.

At the junction of the rim 5 with the walls 3 and 4 of the clamping member, there are parallel vertically disposed clips 10, preferably looped or U-shaped, each clip having the ends thereof formed integral with the walls 3 and 4 at the junction of the rim 5. The clips 10 coöperate with the rim 5 in safely and firmly holding the lens 6 and it is these elements that obviate the necessity of drilling the lens 6 and resorting to the use of a screw or similar hold-fast devices.

Reference will now be had to Figs. 3, 4 and 5, in connection with the clamping member 2. The top wall 3 of said member is provided with an opening 11 vertically alining with an opening 12 in the bottom wall 4, and the walls of the opening 12 are screwthreaded. Extending through the opening 11 and adjustably mounted in the opening 12 is a screw 13 and it is by virtue of this screw that the walls 3 and 4 are contracted and shifted relatively to each other for contracting the rim 5 upon the lens 6. The screw 13 has an integral collar 14, adjacent to the head 15 thereof, said collar resting upon the wall 3 and serving as a pivot for a finger piece 16. The forward end of the finger piece 16 terminates in a finger grip 17 that is held normally in parallelism with the front side of the lens 6. The finger piece is supported in a horizontal position from the wall 3 and the rear end thereof terminates in a yoke 18.

Pivotally connected to the end of the yoke 18, as at 19, is the arm 20 of a guard 21, said guard being of the ordinary and well known type designed for engaging the nose.

Adjustably mounted upon the screw 13, between the walls 3 and 4 is a sleeve 22 having a longitudinal slot 23. Mounted in the slot 23 is the end of a spiral band spring 24, said spring having a single convolution that terminates in a hook 25 engaging the yoke 18, as best shown in Fig. 3. The tension of the spring 24 is sufficient to retain the guard 21 in what might be termed a closed position, whereby it will be necessary to press upon the finger grip 17 to open the guards in order that the eye glasses can be placed upon the nose.

The sleeve 22 has the lower end thereof resting upon the wall 4 and the lower end of said sleeve is provided with a radially disposed hook-shaped extension 26, which extends outwardly from under the spring 24 and engages the edge of the wall 4, as best shown in Fig. 5. The extension 26 frictionally engages the wall 4 and constitutes means to facilitate moving the sleeve 22, whereby the tension of the spring 24 can be increased from time to time, by simply tightening the screw 13 after moving the extension 26.

A very compact arrangement of the parts is illustrated in Figs. 7, 8 and 9, showing a modification of the invention, wherein the sleeve 22 is formed integral with or carried by a finger piece 27 that simply has a depending end 28 in lieu of the yoke 18. A guard is connected to the depending end 28 and the sleeve 22 and the finger piece 27 are arranged between the walls 3 and 4 with the finger piece 27 in proximity to the wall 3. A spring 29, similar to the spring 24, has one end thereof attached to the sleeve 22 and the opposite end thereof is placed in engagement with the end of the bridge 1, the spring in this instance serving the same purpose as the spring 24. By referring to Fig. 8, it will be observed that this arrangement of parts obviates the necessity of using a stepped screw, and that the spring 29 is completely housed and cannot become accidentally displaced. I attach considerable importance to this arrangement of parts on account of the simplicity and durability, when compared with eye glasses having springs located above or below the ends of the bridge.

From the foregoing, it will be observed that my invention possesses the following advantages:—First, that of making the bridge, rims and clips integral; second, that of providing clamping members intermediate the ends of the bridge and the rims for the spring adjustment of the guards; third, that of making the clips integral with the rims and providing means whereby a lens can be held in the rim between the clips without weakening any portion of a lens or glass, and fourth, that of being able to adjust the tension of a spring used in connection with a guard. The above are simply a few of the advantages derived from my invention, and while in the drawings there are illustrated the preferred embodiments of the same, I would have it understood that the structural elements are susceptible to such variations and modifications as fall within the scope of the appended claims.

What I claim is:—

1. As a new article of manufacture, a contractible lens rim having parallel clips formed integral with the ends of said rim and adapted to coöperate with said rim in holding a lens.

2. As a new article of manufacture, an eye glass rim having integral parallel clips and an integral bridge.

3. As a new article of manufacture, an eye glass bridge having the ends thereof integral with the ends of contractible rims.

4. In eye glasses, contractible rims, parallel clips formed integral therewith and connecting the ends of said rims, and means for contracting said rims.

5. In eye glasses, a bridge, contractible rims having ends formed integral with said bridge, and means at the ends of said bridge for contracting said rims.

6. In eye glasses, a bridge, contractible rims, clamping members formed integral with the ends of said rims and with the ends of said bridge, and means carried by said clamping members for contracting said rims.

7. In eye glasses, a bridge, contractible rims, clamping members connecting the ends of said rims to said bridge, parallel clips carried by said clamping members and means carried by said clamping members for contracting said rims.

8. In eye glasses, a bridge, contractible rims, clamping members connecting said rims to said bridge, and spring pressed guards supported from said clamping members.

9. In eye glasses, a bridge, contractible rims, clamping members connecting said rims and said bridge, clips carried by said clamping members, means carried by said clamping members for contracting said rims, and spring actuated finger pieces supported by said clamping members.

10. In eye glasses, a bridge, clamping members carried thereby, rims carried by said clamping members and adapted to hold lenses, finger pieces pivotally supported by said clamping members, guards carried by said finger pieces, means within said clamping members for holding said guards normally closed, and means carried by said clamping members for adjusting the first mentioned means.

11. In eye glasses, a bridge, clamping members carried thereby, contractible rims carried by said clamping members, finger pieces pivotally supported by said clamping members, guards carried thereby, and means within said clamping members for holding said guards normally closed.

12. In eye glasses, a bridge, clamping members carried thereby, contractible rims carried by said clamping members, clips carried by said clamping members and coöperating with said rims in holding lenses, means carried by said clamping members for contracting said rims, and guards movably supported by said means.

13. In eye glasses, a bridge, clamping members carried thereby, contractible rims carried by said clamping members, clips carried by said clamping members and coöperating with said rims in holding lenses, means carried by said clamping members for contracting said rims, guards movably supported by said means, and means coöperating with the first mentioned means in holding said guards normally closed.

14. In eye glasses, a bridge, parallel lens clips formed integral therewith, and means contractible at a point between said clips and said bridge and coöperating with said clips for holding lenses between said clips.

15. In eye glasses, a bridge, clamping members carried thereby, clips carried by said clamping members, contractible rims carried by said housings, means extending through said clamping members for contracting said rims, guards pivotally supported by said means, and a spring adjustment in each clamping member for holding said guards normally closed.

16. In eye glasses, a bridge, clamping members carried thereby and adapted to support lenses, finger pieces pivotally supported by said clamping members, guards carried thereby, means within said clamping members for holding said guards normally closed, and means for adjusting the first mentioned means.

17. In eye-glasses, the combination of a bridge having bifurcated ends forming parallel walls with lens engaging end portions, said walls being adapted to be moved toward each other to bring said portions into firm engagement with the lenses, guards supported by said bifurcated ends, and means passing through said guards and walls of said ends to pivotally attach the guards and force the walls toward each other.

18. In eye glasses, the combination of lens engaging means, a bridge, parallel walls connecting said means and the ends of said bridge, members pivotally supported between said walls, flat helical springs surrounding each of said members with an inbent end engaged with and held thereby, and guards pivotally supported to swing about the axes of said members and having the outer ends of said springs engaged therewith.

19. In eye glasses, the combination of lens engaging means, a bridge, parallel walls connecting said means and the ends of said bridge, members pivotally supported between said walls, flat helical springs surrounding each of said members with an inbent end engaged with and held thereby, guards pivotally supported to swing about the axes of said members and having the outer ends of said springs engaged therewith, and means for turning said members and holding the same in the position to which they are adjusted to adjust the tension of said springs.

20. In eye glasses, the combination of a bridge having bifurcated ends forming parallel walls, guards supported by said bifurcated ends, a sleeve between the walls of each of said ends, a flat helical spring surrounding the sleeve with the inner end thereof engaged with a slot in the sleeve and its outer end engaged with one of the guards, a screw passing through the sleeve and engaging openings in the walls and an arm on the sleeve frictionally engaging one of the walls and by means of which the sleeve may be turned to adjust the tension of the spring and adapted to hold the sleeve against turning.

In testimony whereof I affix my signature in presence of two witnesses.

GEORGE H. CHAPEL.

Witnesses:
FRANCIS J. SHIELDS,
NINA C. JENSEN.